United States Patent [19]
Rivas

[11] Patent Number: 6,092,857
[45] Date of Patent: Jul. 25, 2000

[54] ANCHORABLE VEHICLE COVER

[76] Inventor: Lawrence E. Rivas, 585 E. "G" St., Colton, Calif. 92324

[21] Appl. No.: 09/096,222

[22] Filed: Jun. 11, 1998

[51] Int. Cl.⁷ .................................................. B60J 11/00
[52] U.S. Cl. ............................................................. 296/136
[58] Field of Search .................................. 296/136, 95.1, 296/98; 150/166, 168; 160/370.21, 370.22, 370.23, 24, 243

[56] References Cited

U.S. PATENT DOCUMENTS

| | | | |
|---|---|---|---|
| 4,657,298 | 4/1987 | Yong O | 296/136 |
| 4,718,711 | 1/1988 | Rabbit . | |
| 4,834,446 | 5/1989 | Tung-Chow | 296/136 |
| 4,958,881 | 9/1990 | Piros | 296/98 |
| 5,022,700 | 6/1991 | Fasiska et al. | 296/98 |
| 5,078,330 | 1/1992 | Hall . | |
| 5,176,421 | 1/1993 | Fasiska . | |
| 5,244,245 | 9/1993 | Kashino . | |
| 5,294,167 | 3/1994 | Yu . | |
| 5,364,155 | 11/1994 | Kuwahara et al. . | |
| 5,409,286 | 4/1995 | Huang . | |
| 5,597,196 | 1/1997 | Gibbs | 296/98 |
| 5,597,197 | 1/1997 | Mowar et al. . | |
| 5,795,009 | 8/1998 | Sack et al. | 296/136 |
| 5,855,406 | 1/1999 | Vargo | 296/136 |

*Primary Examiner*—D. Glenn Dayoan
*Assistant Examiner*—Lori L. Coletta
*Attorney, Agent, or Firm*—Knobbe, Martens, Olson & Bear, LLP

[57] ABSTRACT

A car cover assembly incorporating a container that is adapted to be anchored to a portion of an automobile. The car cover assembly includes an anchor member in the form of an elongate pipe or tube that is attached to the container containing the cover via straps. The pipe is adapted to be deposited in the trunk of the automobile and the trunk lid can then be closed on the straps so as to anchor the container to the rear end of the automobile. The cover is stored within a cavity defined by the container and the cover includes a handle which is accessible by the user. The user grasps the handle and extracts the cover from the container while the container is anchored to the rear end of the automobile and then correctly positions the cover about the automobile.

21 Claims, 5 Drawing Sheets

ANCHORABLE VEHICLE COVER

BACKGROUND OF THE INVENTION

1. Field of the Invention

The present invention relates to vehicle accessories and, in particular, concerns a cover for an automobile that is adapted to be anchored to the automobile prior to the complete positioning of the cover over the automobile.

2. Description of the Related Art

Owners of automobiles often want to cover their automobiles with some sort of cover so as to protect the vehicle from the elements. It is well understood that sunshine, rain and other weather conditions can seriously damage the finish of an automobile. In fact, prolonged exposure to the elements may result in the vehicle taking on an undesired appearance. This problem has become more pressing in congested urban environments where automobile owners are increasingly having to park their vehicles outside.

To address these particular problems, covers have been developed that are adapted to cover some, or possibly all, of the outer surface of the automobile. Typically, these covers consist of a single piece of fabric that is sewn together so as to define one generally large opening with a cavity therein. The cover is positioned on the car so that the perimeter of the opening is positioned adjacent the bottom surfaces of the automobile so that substantially all of the outer surfaces of the automobile are positioned within the cavity defined by the cover.

The covers are then often secured on the automobile by fasteners and the like. In some covers, the portion of the cover adjacent the opening is lined with an elastic material so that the opening generally grasps surfaces of the automobile so as to retain the cover on the automobile.

Covers of these types are very commonly used today and are made of a variety of materials that are adapted to protect the finish of the automobile from weather related damage. While these covers are commonly used and are generally successful in protecting the appearance of automobiles, these covers are often difficult to install onto the automobile. Typically, the user who is to position this cover onto an automobile must initially unstow the cover and then locate the perimeter of the opening that is to be positioned over the automobile. As the covers are usually stowed in a very compact form, this typically requires the user to at least partially spread the cover out so as to be able to find the perimeter of the opening prior to positioning the cover on the automobile. After locating the perimeter of the opening, the user then typically attempts to position an edge of the opening on a particular surface of the automobile.

For example, with a generally rectangular cover that is to entirely cover an automobile, the user may often initially find the rear surface of the opening that is adapted to be positioned adjacent the rear bumper of the automobile. The user then positions the rear surface of the opening adjacent the rear bumper of the automobile and then drags the rest of the cover forward over the top of the automobile so that the front surface of the opening of the cover can be positioned adjacent the opposed front bumper of the automobile.

However, there are several difficulties associated with performing this operation. Initially, it is often very difficult to easily locate any particular surface of the opening of the cover without at least partially spreading the cover out. In many circumstances, it is very inconvenient to be able to spread the cover out sufficiently so as to be able to identify the different portions of the opening to the cover. In fact, in some circumstances, it may be impossible to spread the cover out sufficiently to accurately locate a specific portion of the cover. Moreover, in windy conditions, the cover may be blown by the wind while the user is attempting to correctly orient the cover for positioning on the vehicle.

A further problem is that when the user partially installs the cover on, for example, the rear bumper of the automobile and then pulls the remainder of the cover over the top of the automobile so as to be able to position the front portion of the cover adjacent to the front bumper of the automobile, the partially installed rear portion of the cover may be pulled loose off of the rear of the automobile. For anyone who has attempted to put a cover on a car, it will be well appreciated that the problem of the partially installed cover becoming dislodged as a result of attempting to fully install the cover on the automobile is a very common, exasperating problem. This problem can also be exacerbated in certain weather conditions, such as wind, which can result in the cover becoming more easily dislodged.

To address this particular problem, automobile covers that are anchored to the automobile have been developed. For example, U.S. Pat. No. 5,176,421 discloses an automobile cover system which includes a container that is adapted to store the cover. The container is mounted to the car via metallic straps and a hinge system so that the container can be swung out from the trunk of the vehicle to thereby allow the cover to be extracted from the container with the container being anchored to the vehicle. While the system disclosed in the U.S. Pat. No. 5,176,421 allows for the cover to be anchored, the system is relatively cumbersome and complex. Initially, the system is adapted to be permanently mounted within the trunk of the automobile thereby permanently occupying valuable trunk space. Moreover, the system discloses the cover being on a spool positioned inside the container which is a very complex arrangement adding to the expense of the cover and also limiting the width of the cover to the width of the spool.

U.S. Pat. No. 5,364,155 also discloses a car cover that is contained within a pouch that is adapted to be anchored to the inner portion of the trunk. This cover is not spooled and is contained within the pouch with the pouch being attached to the hinges of the trunk via straps. While this cover is anchored during positioning of a cover over the automobile, the anchoring of the cover to the trunk is very cumbersome in that the straps much stretch across the full width of the trunk and then be tied to the hinges of the trunk. Consequently, the device disclosed in U.S. Pat. No. 5,364,155 must either be installed in the automobile on a more permanent basis, thereby occupying trunk space and inhibiting easy use of the trunk, or the user must secure the cover assembly to the interior of the trunk each time the user wishes to use the cover device.

Moreover, the difficulties associated with locating various portions of the opening of the cover are not particularly well addressed by the device disclosed in the U.S. Pat. No. 5,364,155. In particular, the user must still at least partially remove the cover so as to be able to find the region of the opening that is adapted to be mounted on the front of the automobile. Again, this problem can be accentuated in certain weather conditions, such as high wind, where the cover would become increasingly cumbersome.

U.S. Pat. No. 5,078,330 discloses yet another vehicle cover that is adapted to be anchored to the rear of the automobile. The cover assembly disclosed in this patent includes a container that has the cover on a spool which, as discussed above, results in a more complex, more expensive automobile cover. Moreover, this device is also difficult to install in the trunk of the automobile. In particular, the user must position a strap around an internal component of the trunk while both simultaneously holding the cover assembly in a desired position on the rear of the automobile and shutting the automobile trunk. Hence, the user must engage in a particularly cumbersome exercise to install the cover assembly on the automobile before use.

From the foregoing, it will be appreciated that there is a need for a car cover that can be anchored to the vehicle in such a manner that the anchoring can be accomplished easily and simply without requiring the cover to be permanently or near permanently mounted to the vehicle. Moreover, there is a need for a cover that also allows the user to easily locate the portion of the cover adjacent the opening in the cover that is to be positioned on the surface of the vehicle that is opposite to the surface to which the cover is anchored.

SUMMARY OF THE INVENTION

The aforementioned needs are satisfied by the automobile cover assembly of the present invention which is comprised of a container that defines a cavity and a cover that is attached to the container and is adapted to be stored therein, wherein the cover defines an opening that is adapted to be positioned about the automobile. The automobile cover assembly of the present invention also includes an anchor member that is attached to an outer surface of the container via at least one strap. The anchor member is adapted to be dropped into the interior of a trunk of the automobile with the container being positioned outside of the trunk so that the lid of the trunk can be shut on the at least one strap so that the anchor member and the strap anchor the container in a position on the rear of the automobile to thereby allow the user to easily withdraw the cover from the cavity of the container.

In one embodiment, the cover member also includes a handle that is readily identifiable by the user. The handle is preferably positioned on the cover adjacent the portion of the cover that is adapted to be positioned on the surface of the automobile opposite the surface to which the container is anchored. The user can then find the handle with the cover still stuffed within the container and then drag the cover over the vehicle to the opposite side while grasping the handle. The user can then position the surface of the opening of the cover about the front end of the automobile and then return to position the surface of the cover adjacent the container about the rear end of the automobile so that the cover is fully installed over the automobile.

In another embodiment, a protecting member is attached to the container so that a protective cloth can be interposed between the container and the surface of the automobile. In one embodiment, the protective member is comprised of a cloth that is attached to the container and is capable of being stored within the container. However, once the container is anchored to the back of the automobile, the protecting cloth can be positioned adjacent the surface of the automobile so that the container does not contact the surface of the automobile directly.

In another embodiment, the cover is adapted to be removably connected to the inner surface of the container so that the cover can be easily removed from the container for washing. Moreover, the anchor member, in one embodiment, is adapted to have the shape of a tube which can be used to store automobile related implements such as flashlights, tools, road flares, and the like.

From the foregoing, it should be apparent that the automobile cover of the present invention is easily installed on the automobile by simply dropping the anchor member into the trunk and then shutting the lid of the trunk on the at least one strap connecting the anchor member to the container so that the container is anchored adjacent to a first surface of the container. The user then simply has to locate the handle, draw the handle over the vehicle to the opposite side and position the perimeter of the opening of the cover about the outer perimeter of the vehicle. The automobile cover of the present invention can thus be quickly installed, e.g., in a matter of a minute or two, on the automobile. These and other objects and advantages of the present invention will become more fully apparent from the following description taken in conjunction with the accompanying drawings.

DETAILED DESCRIPTION OF THE PREFERRED EMBODIMENT

Figure 1:
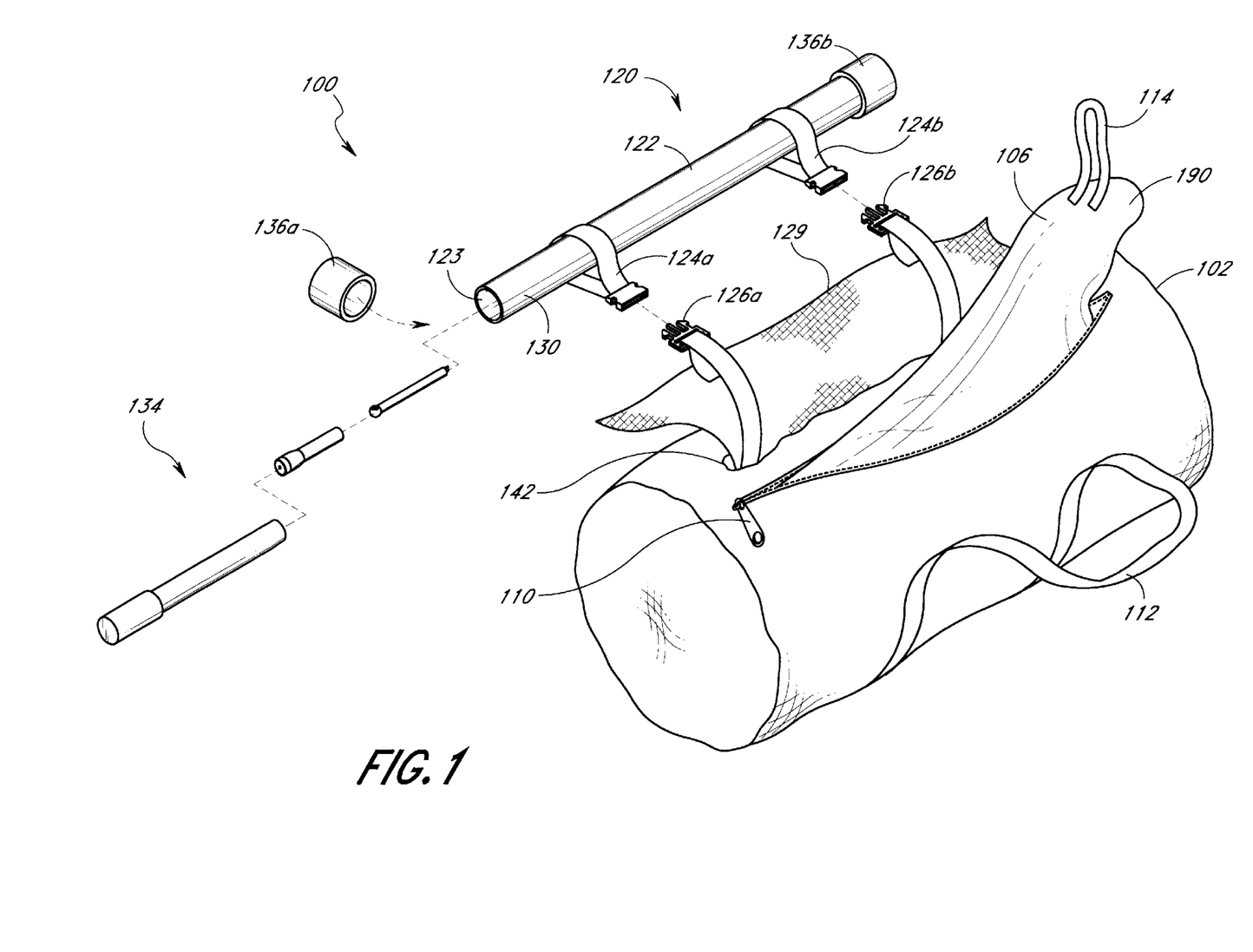
FIG. 1 is a perspective view of one embodiment of a car cover assembly of the present invention.

Reference will now be made to the drawings wherein like numerals refer to like parts throughout. FIG. 1 illustrates the components of a car cover assembly 100 of the preferred embodiment. The car cover assembly 100 includes a container 102 that defines a cavity 104 (FIGS. 2A, 2B) which is adapted to receive a cover 106. The container 102 may be comprised of a soft-sided nylon-type duffle bag where the opening to the cavity 104 can be secured by a zipper assembly 110. One or more carrying straps 112 may also be attached to the outer surface of the container 102 so as to allow for easier carrying and moving of the car cover assembly 100.

The cover 106 is adapted to be stored in the cavity 104 so that the cover 106 can be compactly stored within the container 102 when not in use. In particular, the cover 106 is adapted to be stuffed into the cavity 104. The cover 106 preferably includes a handle 114 that is attached to the cover 106 at a position that is selected to allow for easier installation of the cover on the automobile in a manner that will be described in greater detail below. Preferably, the handle 114 is sized, shaped and colored so as to allow the user to easily find the handle 114 of the cover 106 when the cover 106 is stuffed into the cavity 104 of the container 102.

As is also shown in FIG. 1, the cover assembly 100 also includes an anchor assembly generally designated 120. In particular, the anchor assembly 120 includes an anchor member 122 that is securely attached to the container via two straps 124*a* and 124*b*. In particular, the two straps 124*a* and 124*b* are secured to the anchor member 122 via snap buckles 126*a* and 126*b*, respectively. As shown in FIG. 1, the anchor member 122 is, in this embodiment, comprised of an elongated piece of pipe or tube 130 that defines a cavity 123. The cavity 123 is adapted to receive implements 134, such as flashlights, road flares, polish, cleaning supplies and the like, which are securely retained therein by caps 136*a* and 136*b* that are adapted to be positioned on a first and second end of the pipe 130. The anchor member 122 can also be adapted to be positioned within a (protective sleeve (not shown) so that the anchor member 122 is less likely to damage the finish on the automobile during installation.

Preferably, the anchor member 122 is attached to the container 102 so as to extend generally parallel to the longitudinal axis of a container 102. The strap members 124*a*, 124*b* are attached to the container 102 inside of a second cavity 142 in the manner shown in FIG. 2B. Preferably, the straps 124*a*, 124*b* are long enough so that a user simply has to drop the anchor member 122 inside of the trunk of the vehicle while holding the container 102 via the carrying straps 112 and then shut the trunk lid of the automobile to anchor the container 102 to the automobile in a manner that will be described in greater detail below. The second cavity 142 preferably includes elastic material at the opening to the cavity so as to form a pouch that retains the anchor member 122 within the cavity 142.

As is also shown in FIG. 1, a protective member, which in this embodiment is a protective cloth 129, is anchored within the second cavity 142. The protective cloth 129 can be extracted from the cavity 142 and interposed between the container 102 and the surface of the automobile. The container 102 may be formed out of an abrasive material that may scratch the finish of the automobile after repeated use. The protective cloth 129 is designed to be interposed between the container 102 and the automobile in the manner that will be described in greater detail below. In one embodiment, the protective cloth 129 is attached to the interior of the second cavity 142 via buttons or snaps so that the protective cloth 129 can be easily removed for cleaning.

Figure 2A:
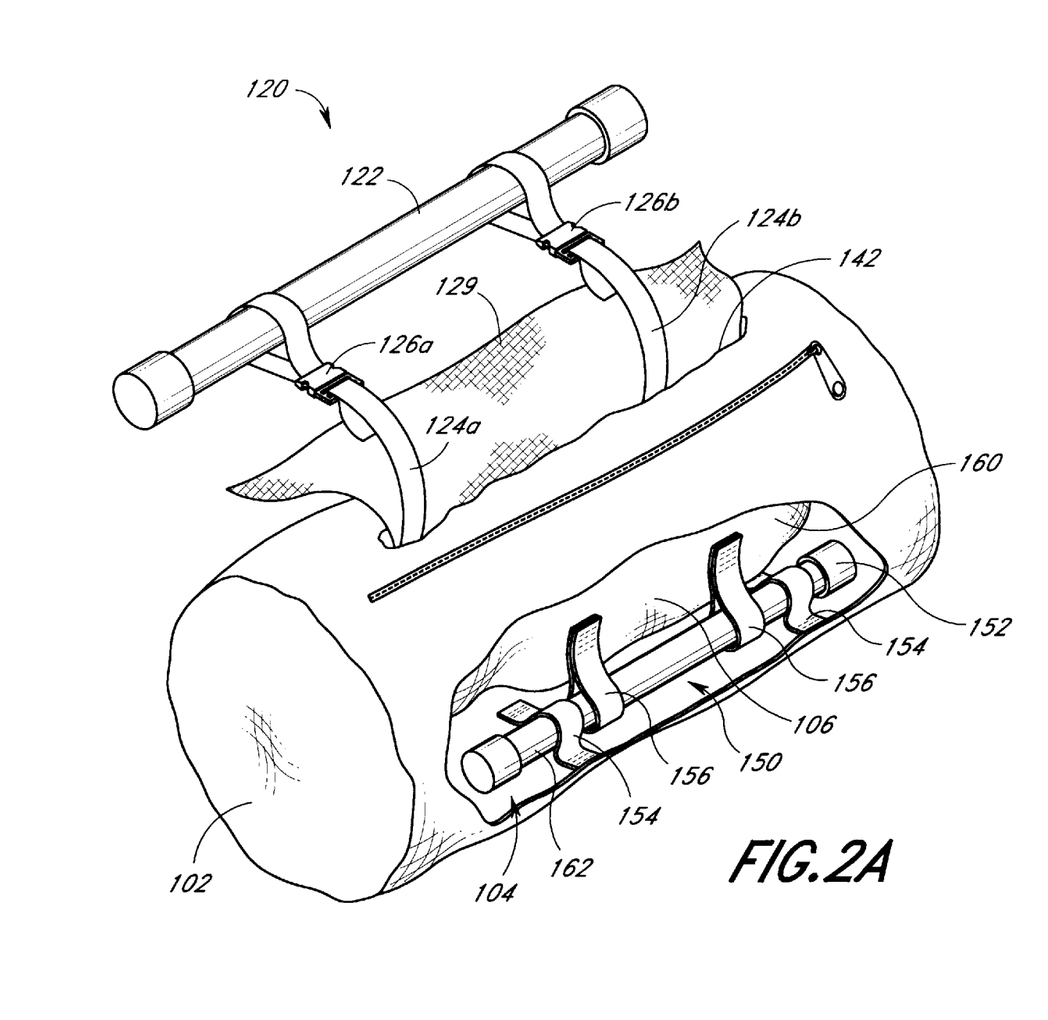
FIG. 2A is a perspective view of the cover assembly of FIG. 1, with a portion of a container broken away to illustrate the attachment of a cover member to the inner surface of the container.
Figure 2B:
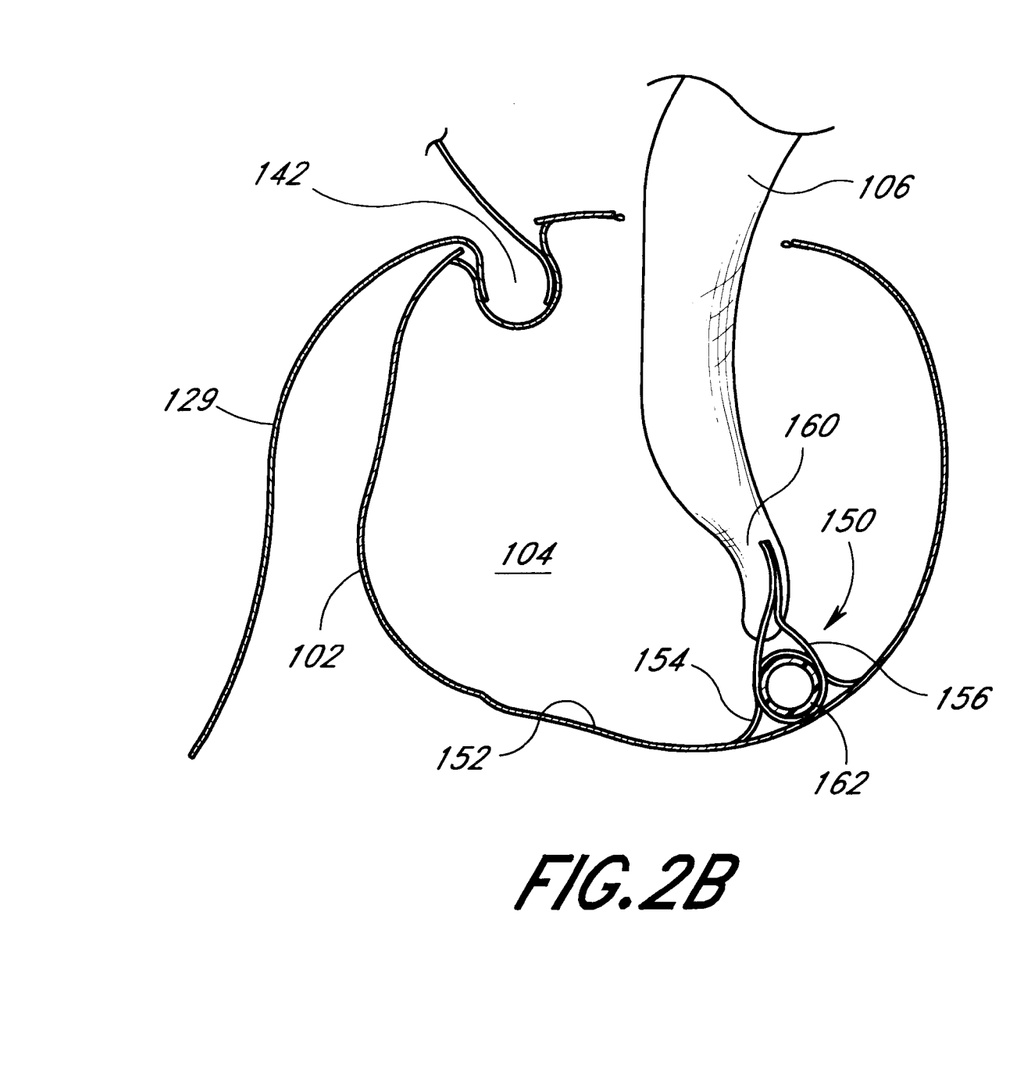
FIG. 2B is a cross-sectional view of the car cover assembly of FIG. 1 illustrating the attachment of the cover member to a container of the car cover assembly of FIG. 1.

FIGS. 2A and 2B illustrate a mounting assembly 150 that allows the cover 106 to be detachably secured to an inner surface 152 of the cavity 104 defined by the container 102. In particular, two loops 154 are sewn to the inner surface 152 of the cavity 132. Similarly, two loops 156 are also sewn to a mounting edge 160 of the cover 106. Each of the loops 154, 156 are adapted to receive a tube 162 within the openings defined by the loops. Hence, to securely attach the cover 106 to the inner surface 152 of the cavity 104 of the container 102, the loops 156 on the mounting edge 160 of the cover 106 are positioned adjacent to the loops 154 that are sewn to the inner surface 152 of the cavity 104. The securing member 162, which in this embodiment is comprised of a length of plastic pipe or tube, is then inserted into the opening defined by each of the loops so that the securing member 162 secures the cover 106 to the inner surface 152 of the container 102.

It will be appreciated that by using a mounting assembly 150, the cover 106 can be easily removed from the container 102 by simply removing the cover 106 from the cavity 132 so as to expose the mounting assembly 150 and then extracting the securing member 162 from the loops 154 sewn to the inner surface 152 and the loops 156 formed on the mounting edge 160 of the cover. The mounting edge 160 of the cover 106 can then be detached from the inner surface 152 of the cavity 123 thereby allowing the cover 106 to be washed. It will be further appreciated that any of a number of assemblies can be used to secure the cover 106 to the interior of the cavity 104 without departing from the spirit of the present invention. These other assemblies can include such things as snaps, buckles and the like. Alternatively, it may even be desirable to simply sew the mounting edge 160 of the cover 106 to the inner surface 152 of the cavity 123.

Referring now to FIG. 2A, the attachment of the straps 124*a*, 124*b* and the cover 106 to the interior of the container 102 is illustrated in greater detail. Specifically, the straps 124*a* and 124*b* are sewn to an inner portion of the material which defines the cavity 142 inside of the container 102. It will, of course, be appreciated that since the straps 124*a*, 124*b* are used to anchor the container 102 to the automobile, it is necessary that the material 146 which defines the cavity 142 be sufficiently strong so as to adequately allow the straps 124*a*, 124*b* to be securely anchored to the container 102. The cavity 142 should also be large enough so that the straps 124*a*, 124*b* and the anchor assembly 120 can be stored within the cavity 142.

In one preferred embodiment, the container 102 is approximately 20 inches long by 12 inches in diameter and is adapted to receive the cover 106 which has approximate dimensions of 200 inches by 70 inches and is adapted to cover a standard mid-sized automobile. The straps 124 are 18 long and 1½ inches wide and the anchor member 122 is comprised of a piece of 2-inch diameter pipe that is approximately 20 inches long. The size and configuration of the automobile cover assembly 100 can, of course, vary depending upon the automobile to be covered without departing from the spirit of the present invention.

Figure 3:
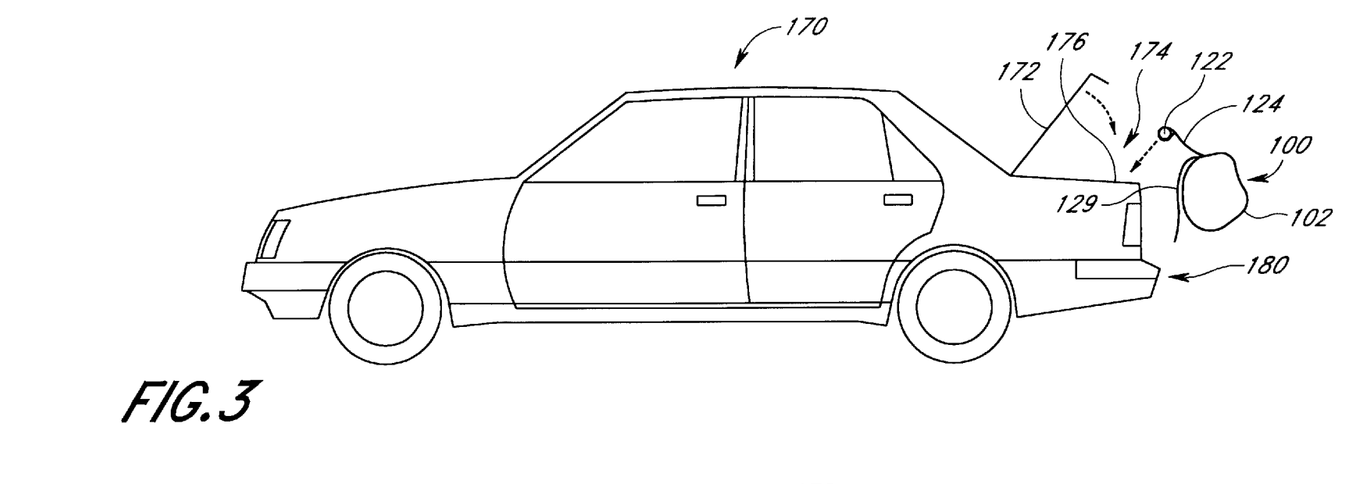
FIG. 3 is a side elevational view of the car cover assembly of FIG. 1 illustrating the positioning of the car cover assembly adjacent the trunk of a vehicle.
Figure 4:
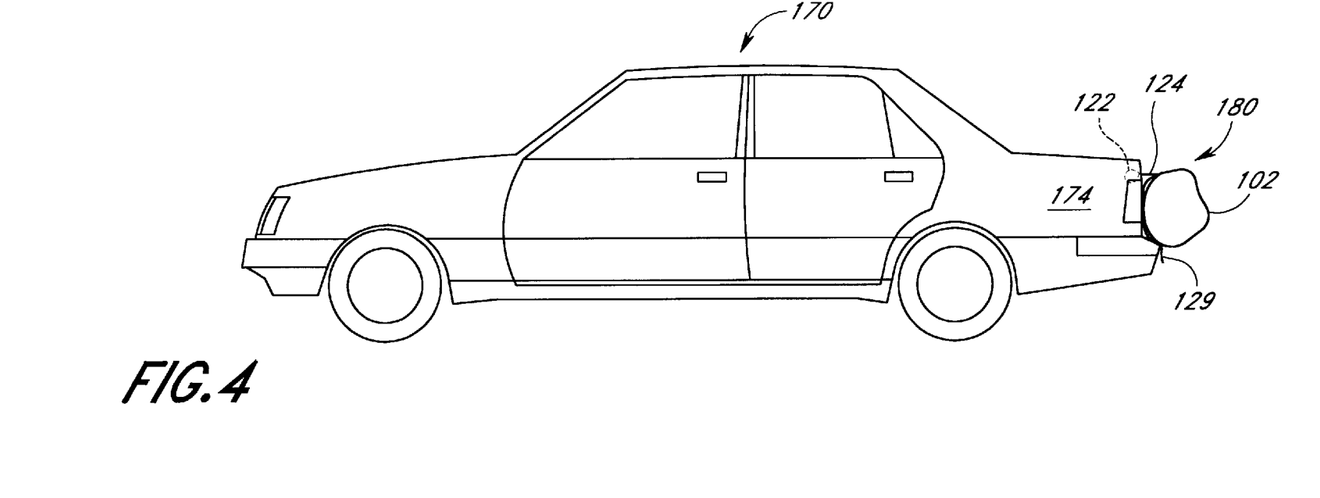
FIG. 4 is a side elevational view illustrating the car cover assembly of FIG. 1 as it is anchored to the rear of an automobile.

The process by which the cover assembly 100 is mounted on an automobile 170 will now be described in greater detail in reference to FIGS. 3–6. Referring initially to FIG. 3, the cover assembly 100 is initially anchored to the automobile 170 by opening the trunk lid 172 of the automobile and depositing the anchor assembly 120 within the trunk 174 of the automobile so that the straps 124*a*, 124*b* are positioned on a lip 176 of the trunk 174 and so that the container 102 is positioned adjacent the rear end 180 of the automobile 170 immediately proximate the bumper. The trunk lid 172 is then closed so that the anchor member 122 is captured within the trunk 174 in the manner shown in FIG. 4.

Preferably, the anchor member 122 has sufficient dimensions so that the anchor member 122 cannot be pulled through the gap between the trunk lid 172 and the lip 176 of the trunk 174. Moreover, the straps 124 are preferably long enough so that the user simply has to drop the anchor member 122 within the trunk 174 and then slam the trunk lid 172 down so as to anchor the cover assembly 100 to the rear end 180 of the automobile 170 in the manner shown in FIG. 4. In particular, the container 102 is securely anchored by the positioning of the anchor member 122 inside of the trunk 174 such that the container 102 will not be dislodged from the rear end 180 of the automobile 170 as a result of the cover 106 being pulled forward.

It will be appreciated that the anchoring of the container 102 onto the automobile 170 is simplified over anchored car covers of the prior art as it simply requires the user to open the trunk lid 172 and drop the anchor member 122 inside of the trunk 174 and then shut the trunk lid 172. There is no requirement that the cover assembly 100 be permanently mounted to the vehicle nor any requirement that the anchor member 122 be secured to an inner portion of the trunk 174 or exactly positioned about a particular component of the trunk 174. Consequently, the cover assembly 100 can be stored more easily in that it does not have to be permanently mounted to the car and its use is very simplified over anchored car covers of the prior art as the user simply has to drop the anchor member 122 inside of the trunk 174 and then shut the trunk lid 172.

As is also shown in FIGS. 3–6, the protective cloth 129 is preferably extracted from the second cavity 142 and interposed between the surface of the container 102 and the rear end 180 of the automobile 170. As discussed above, the protective cloth 129 is adapted to prevent the container 102 from damaging the finish on the rear end of the automobile 170 after the container 102 has been anchored to the rear end of the automobile 170 in the manner shown in FIG. 3.

Once the container 102 is anchored to the rear end 180 of the automobile 170, the user then unzips the zipper 110 of the cavity 104 so as to expose the cover 106 positioned therein. The user then finds the handle 114 (FIG. 1) that is attached to the cover 106 in a position that is adjacent the portion 190 of cover 106 that is adapted to be secured to the front end 192 of the vehicle. The user, while grasping the handle 114, then draws the cover 106 out of the container 102 in the manner shown in FIG. 5. It will be appreciated that the user will be able to grasp the handle 114 and draw the cover 106 out of the container 102 over essentially the full length of the car so that the cover 106 is positioned such that an opening 194 formed in the cover 106 is generally positioned about the outer periphery of the automobile 170. The user can then secure the portion 190 of the cover about the front end 192 of the automobile 170.

Figures 5, 6:
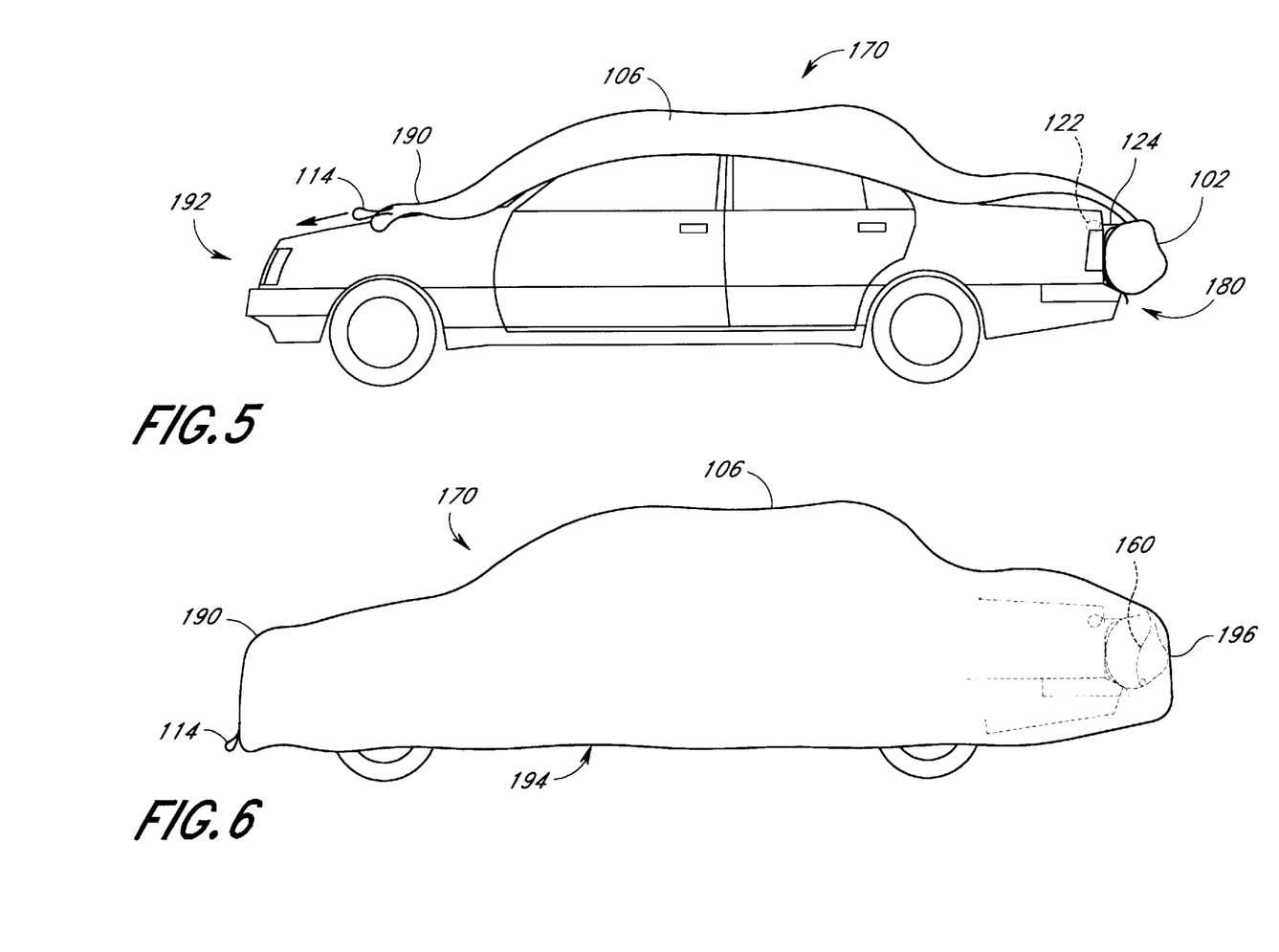
FIG. 5 is a side elevational view illustrating the cover of the cover assembly of FIG. 1 being extracted from the container while the container is anchored to the rear of a vehicle.
FIG. 6 is a side elevational view illustrating the cover of the car cover assembly of FIG. 1 covering an automobile.

Subsequently, the user then returns to the rear end 180 of the automobile 170 and fully removes the remainder of the cover 106 that is positioned within the cavity 104 and the cover 102. The remaining portion of the cover 106 can then be positioned about the rear end of the automobile 170 in the manner shown in FIG. 6. As is also shown in FIG. 6, the mounting edge 160 of the cover extends inward into the container 102 so as to securely retain the cover 106 to the container 102 while still allowing a rear portion 196 of the cover to be extracted from the container 102 so as to fully cover the rear end 180 of the automobile and the container 102.

It will be appreciated that since the front portion 190 of the cover 106 is initially secured to the front end 192 of the automobile 170 substantially along the full width of the automobile, the likelihood that the cover 106 will be dislodged as a result of securing the rear portion 196 of the cover 106 to the rear end 180 of the automobile 170 is reduced. Consequently, installation of the cover 106 on the automobile 170 is simplified by the use of the anchored cover assembly 100 of the preferred embodiment.

It will be further appreciated that since the cover assembly 100 is not permanently secured to the automobile, the flexibility of using the cover assembly 100 of the preferred embodiment is enhanced over similar anchored cover assemblies of the prior art. Moreover, the anchoring of the cover assembly 100 is simplified in that the anchor member 122 simply has to be dropped into the trunk and then the trunk lid has to be closed on the strap 124 thereby eliminating the need for the user to tie or otherwise spend time specifically locating the anchor member about a component of the trunk. In fact, the cover assembly 100 can be easily installed on an automobile within one to two minutes.

Lastly, the use of the handle 114 further simplifies the extraction of the cover 106 from the container 102 in that the user simply has to grasp the handle and pull it towards the front portion of the automobile. As discussed above, the handle 114 is located so that when the handle 114 is positioned adjacent the front end 192 of the automobile, the front portion 190 of the cover 106 is correctly positioned with respect to the automobile so as to allow the cover 106 to be mounted to the automobile 170. Moreover, as both the anchor member 122 and the cover 106 can be secured within the container, the car cover assembly 100 of the preferred embodiment is a lightweight, easily stored, easily transported cover that can be used on a variety of different cars of substantially the same size. It will, of course, be appreciated that the exact configuration of the cover 106 will vary depending upon the size and configuration of the automobile to be covered. Moreover, the cover 106 can also be further adapted to include elastic about the bottom perimeter of the cover so as to further secure the cover 106 to the automobile.

Hence, although the foregoing description of the preferred embodiment of the present invention has shown, described and pointed out the fundamental novel features of the invention, it will be understood that various omissions, substitutions and changes in the form of the detail of the apparatus as illustrated as well as the uses thereof, may be made by those skilled in the art without departing from the spirit of the present invention. Consequently, the scope of the invention should not be limited to the foregoing discussion, but should be defined by the appended claims.

What is claimed is:

1. An automobile cover assembly comprising:
   a cover member that is adapted to cover a portion of an automobile so as to protect the portion of the automobile;
   a container having an inner wall that defines a cavity that is sized so as to allow the cover member to be stuffed in the cavity, wherein the cover member is secured to the inner wall of the container; and
   an anchor member that is attached to the container via at least one strap, wherein the anchor member is adapted to be positioned inside the trunk of the automobile so as to rest freely in the trunk and the strap is adapted to permit the trunk lid to be closed on the strap wherein the anchor member is dimensioned so that the positioning of the anchor member in the trunk and the closing of the trunk lid captures the anchor member in the trunk and anchors the container to the automobile without requiring the anchor member to be secured to a component within the trunk to thereby allow the cover member to be extracted and positioned over the automobile with the container anchored to the automobile.

2. The assembly of claim 1, further comprising a handle attached to a first portion of the cover member.

3. The assembly of claim 2, wherein the cover member defines an opening that is adapted to be positioned about the automobile and the first portion of the cover member is adjacent the portion of the opening that is adapted to be positioned about a front end of the automobile.

4. The assembly of claim 1, wherein the anchor member is comprised of a tube defining a cavity that is adapted to receive road flares, flashlights, polish and cleaning supplies.

5. The assembly of claim 1, wherein the at least one strap is comprised of two straps that are secured to the anchor member via buckles.

6. The assembly of claim 1, wherein the container defines a cavity that is adapted to receive the anchor member and the at least one strap so that the anchor member and the at least one strap can be positioned in the cavity when the assembly is not in use.

7. The assembly of claim 1, wherein the cover member is detachably secured to the inner wall of the cavity defined by the container so as to permit removal of the cover member from the container for washing.

8. The assembly of claim 7, further comprising a securing member that engages with the cover member and the inner wall of the cavity defined by the container so as to detachably secure the cover member to the container.

9. The assembly of claim 8, wherein cover member defines a mounting section and has at least one loop formed on the mounting section and wherein the inner wall of the cavity of the container further includes a loop formed thereon and wherein the securing member engages with the loop on the cover member and the loop on the inner wall of the container to secure the cover member to the inner wall of the cavity defined by the container.

10. An automobile cover assembly comprising:
   a cover member that is adapted to cover an automobile, the cover member defining a first portion that is adapted to be positioned about the front end of the automobile;
   a container that defines a cavity that is adapted to receive the cover member in a storage configuration and wherein the cover member includes a mounting section that is adapted to be detachably secured to the container;
   an anchor assembly which includes an anchor tube and a flexible strap, wherein the flexible strap is connected to the anchor tube and the container so that the anchor tube can be deposited inside of a trunk of the automobile so as to hang freely in the trunk with the container positioned adjacent the rear end of the automobile with the strap extending out of the trunk of the automobile so that when the trunk lid is closed the anchor assembly is anchored on the rear end of the vehicle as a result of the anchor tube being captured within the trunk; and
   a handle attached to the cover member adjacent the front portion of the cover member so that a user can grasp the cover member and extract the cover member out of the container so that the cover member can be positioned on the automobile.

11. The assembly of claim 10, wherein the cover member is adapted to be stuffed in the cavity and is detachably secured to the inner wall of the cavity defined by the container so as to permit removal of the cover member from the container for washing.

12. The assembly of claim 11, further comprising a securing member that engages with the cover member and the inner wall of the cavity defined by the container so as to detachably secure the cover member to the container.

13. The assembly of claim 12, wherein the cover member has at least one loop formed on the mounting section and wherein the inner wall of the cavity of the container further includes a loop formed thereon and wherein the securing member engages with the loop on the cover member and the loop on the inner wall of the container to secure the cover member to the inner wall of the cavity defined by the container.

14. The assembly of claim 10, wherein the anchor tube is adapted to receive a road flare or a flashlight.

15. The assembly of claim 10, wherein the container defines a second cavity that is adapted to receive the anchor assembly so that the anchor assembly can be stored when the automobile cover assembly is not in use.

16. The assembly of claim 10, further comprising a protective member that is attached to the container so as to be positioned between the container and the automobile when the container is mounted adjacent the rear end of the automobile so as to protect the rear end of the automobile from damage caused by the container.

17. A method of covering an automobile comprising the steps of:
   positioning an anchor member inside of a trunk of an automobile so that the anchor member rests inside the trunk without being secured to a component in the trunk and so that a strap extends out of the trunk to a container positioned adjacent the rear end of the automobile;
   shutting the trunk lid so that the trunk lid is latched with the anchor member positioned inside the trunk and with the strap extending out of the trunk so that the anchor member is captured within the trunk so that the container is anchored at the rear portion of the vehicle as a result of only the anchor member being positioned in the trunk with the trunk lid shut; and
   extracting an automobile cover that is detachably secured to the container, at least partially out of the container so as to cover the automobile.

18. The method of claim 17, wherein the extracting step comprises grasping a handle that is attached to a first portion of the automobile cover that is stuffed in a cavity defined by the container and moving the handle to the front portion of the automobile.

19. The method of claim 18, further comprising the step of positioning the cover member over the automobile with the cover member secured to the container.

20. The method of claim 17, further comprising the step of detaching the cover member from the container so as to permit the cover member to be washed.

21. The method of claim 20, wherein the detaching step comprises removing a securing member that is positioned in an opening defined by at least one loop formed on the cover member and from an opening that is defined by at least one loop formed on the container.

* * * * *